United States Patent Office 3,518,371
Patented June 30, 1970

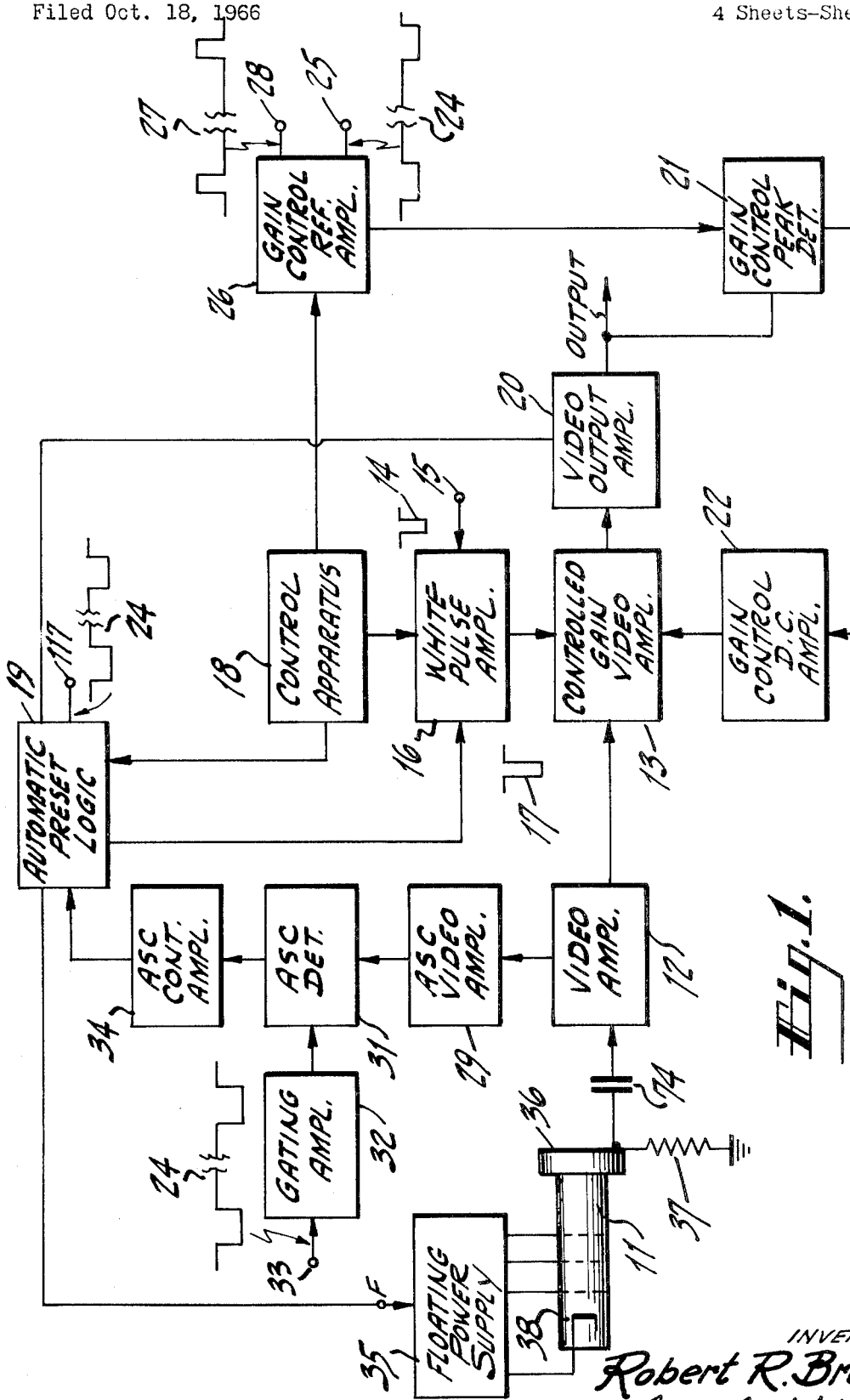

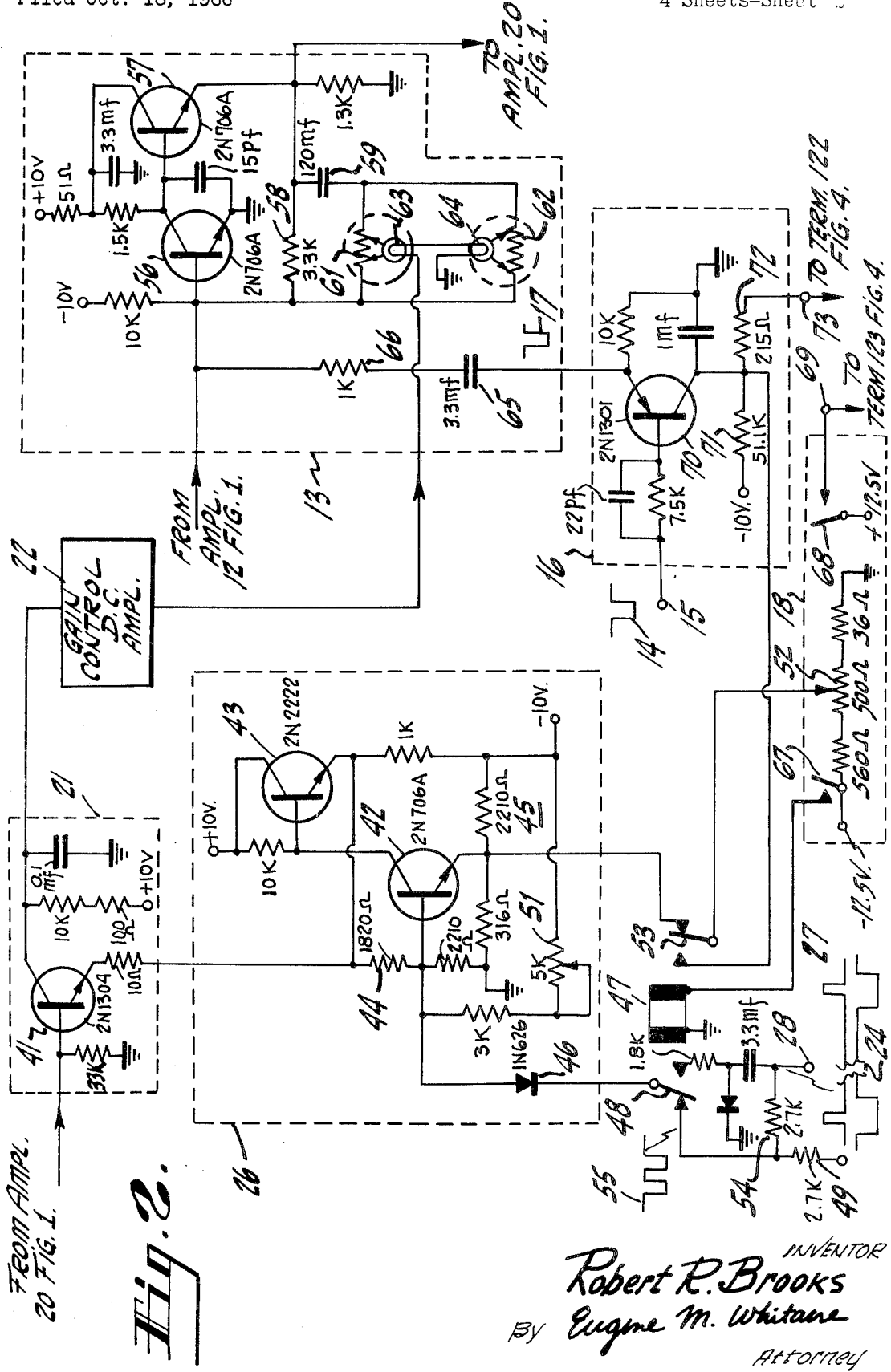

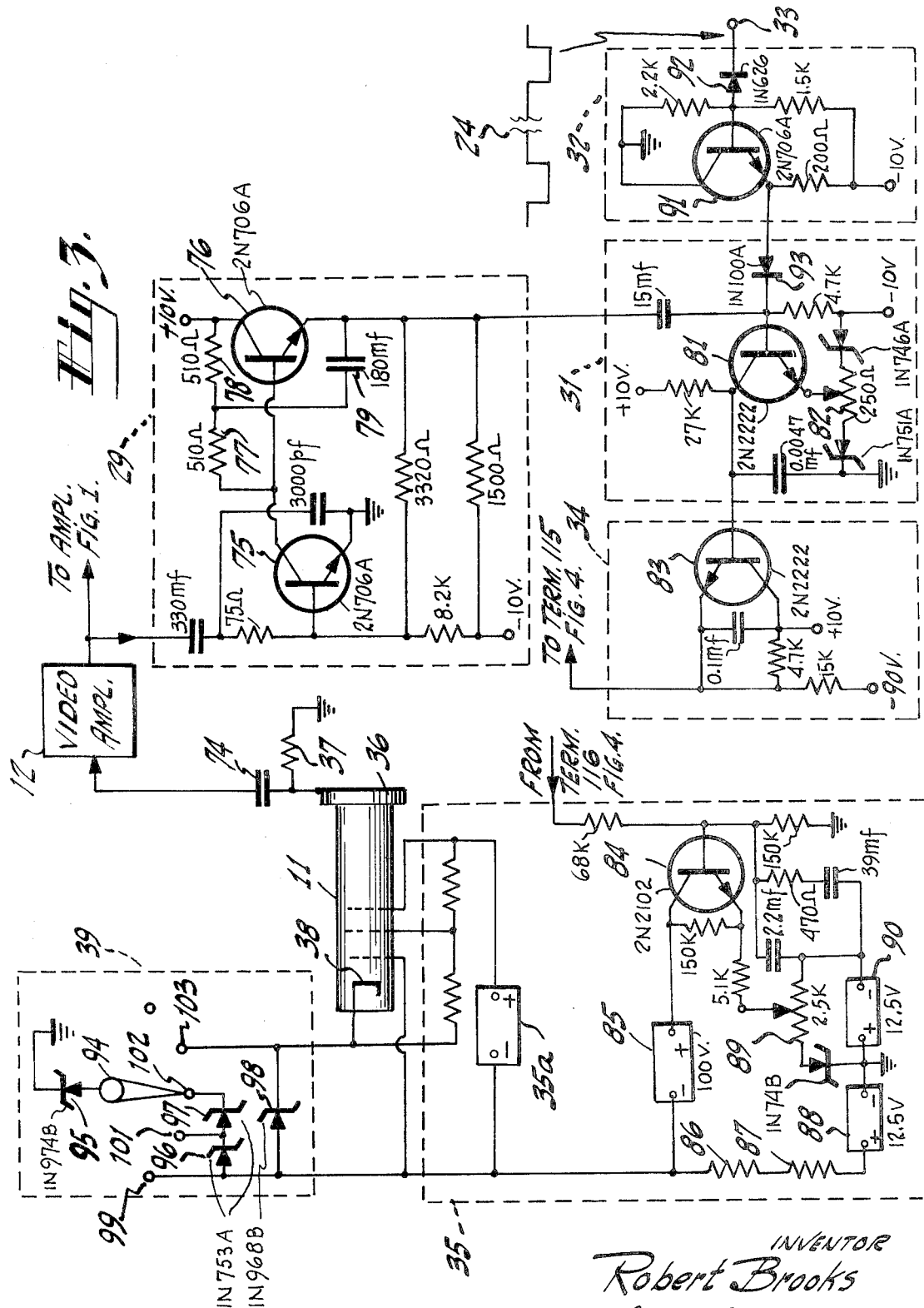

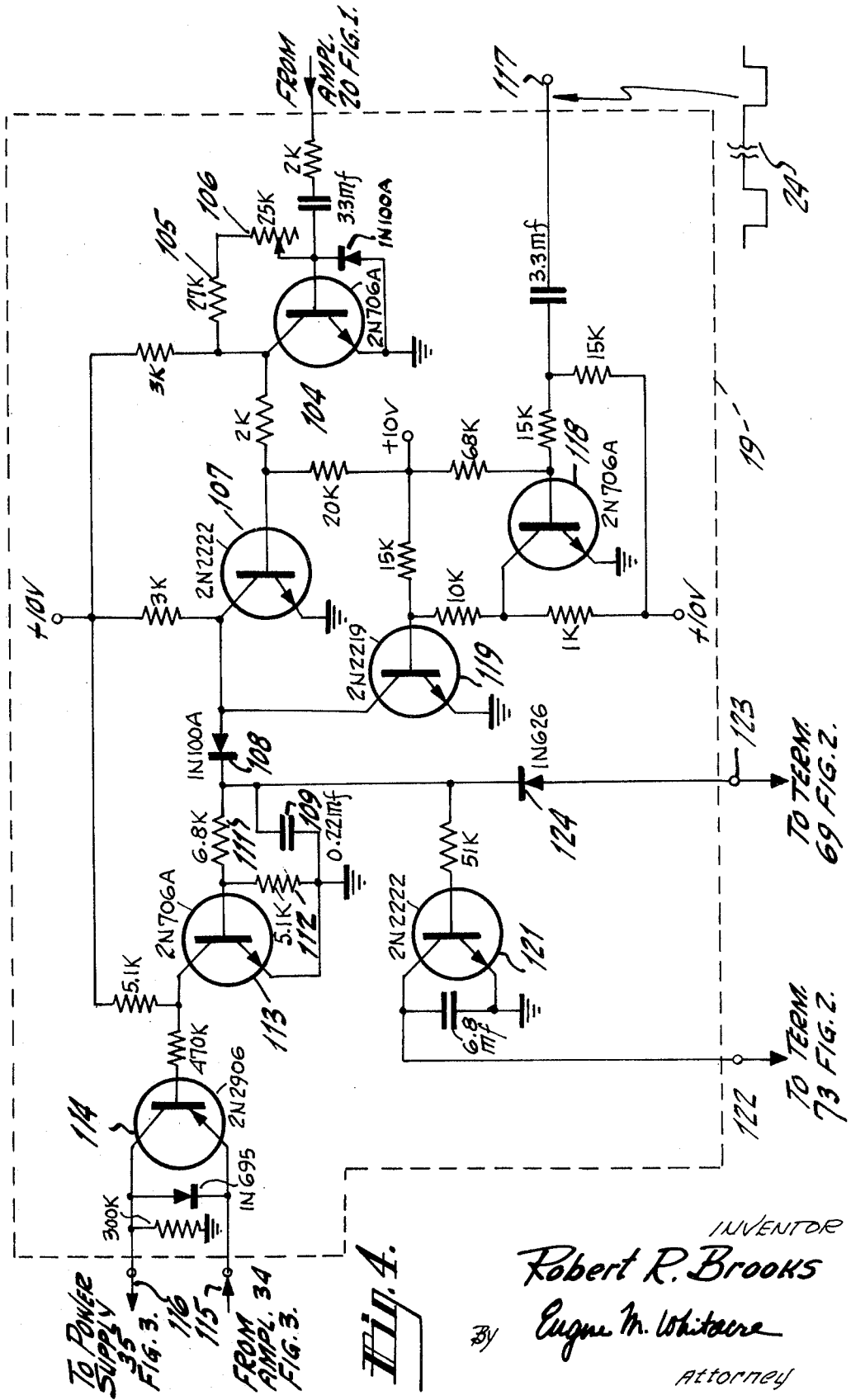

3,518,371
PRESET SENSITIVITY AND AMPLIFICATION CONTROL SYSTEM
Robert R. Brooks, Willingboro, N.J., assignor to RCA Corporation, a corporation of Delaware
Filed Oct. 18, 1966, Ser. No. 587,497
Int. Cl. H04n 5/34
U.S. Cl. 178—7.2                    10 Claims

ABSTRACT OF THE DISCLOSURE

In a television camera control system, apparatus is provided for automatically increasing the camera sensitivity to a selected maximum in response to decreased light, at which point the automatic sensitivity control circuit is interrupted and the sensitivity is returned to a nominal predetermined value so that, upon a subsequent increase in light and a return to automatic operation, no sudden change in sensitivity is required, thereby avoiding the development of objectionable transients in the resultant video signal.

---

This invention relates to the automatic control of signal generating and/or processing apparatus and particularly to the sensitivity control of the signal generating apparatus and the amplification control of the signal processing apparatus.

Where transducing apparatus is used to convert input intelligence of one form into output intelligence of another form, it frequently is the practice to automatically control the sensitivity of the transducing apparatus so as to maintain the average level of the transducer output intelligence substantially constant despite any changes in the average level of the transducer input intelligence. Also, where amplifying apparatus is used to amplify intelligence in the form of electrical signals, for example, it often is the practice to automatically control the gain (i.e. amplifying capability) of the amplifying apparatus so as to maintain the average level of amplifier output intelligence substantially constant despite any changes in the average level of the amplifier input intelligence.

When the input intelligence of the amplifying apparatus is the output intelligence of the transducing apparatus and when both types of automatic controls are used, extreme conditions of the input intelligence to the transducer sometimes are encountered. Under such conditions the operation of the automatic sensitivity control system causes the production in the output of the transducer of undesired spurious effects which tend to mask the desired output intelligence. In response to such a mixed input to the amplifier the automatic gain control system, in attempting to effect the amplification of the partially masked intelligence, also causes the amplification of the undesired spurious effects, thereby producing a signal in the amplifier output which is unsatisfactory for use. In many cases it is considered better to have no signal at all than to have one which is so mutilated.

An illustrative example of a case in which such a problem is encountered is in television video signal generating apparatus. It is customary in the operation of video signal generating apparatus, particularly that used for producing signals from motion picture film, to make suitable provisions for automatically changing the sensitivity of the pickup device as the amount of light impinging upon the device varies so as to maintain a substantially constant level of video signals in the output from the pickup device. It also is customary to provide amplifiers for the video signal which include an automatic gain control facility, again directed to the end of maintaining a substantially constant level of video signals.

In the operation of such apparatus there are conditions under which the video signal level derived from the pickup device is less than desired despite an increase in the sensitivity of the pickup device. Under such conditions the gain control apparatus functions to increase the video signal level by increasing the gain of the amplifiers. When both sensitivity and gain controls are automatic, there are conditions encountered in which the sensitivity of the pickup device is increased to the point where only a weak signal comprising principally undesired spurious signals are derived. An example of such a situation is when the subject is in the form of motion picture film and the picture recorded thereon fades to black. The automatic gain control apparatus, functioning in response to such weak signals, increases the amplifier gain and the spurious signals are amplified beyond any practical useful point.

If, while the pickup device sensitivity and the amplifier gain are high in response to little or no light from the subject, the subject representative light on the pickup device returns to a normal level, the developed video signal may include an objectionable transient effect. The reason for such an undesired result is that the sensitivity control system must be fast acting in order to reduce the sensitivity in response to a sudden increase in light so as to prevent overloading the system with abnormally large signals. At the same time, the sensitivity control system must have a sufficiently long time constant to avoid losing low frequency information.

It is an object of the present invention, therefore, to provide a transducer, such as a television camera, with a preset sensitivity and amplification control system which prevents overloading of the signal processing apparatus and obviates, or at least minimizes, the production of undesired signal transients.

In accordance with an illustrative embodiment of the invention, a nominal sensitivity for the camera pickup tube is established preliminary to operation. The sensitivity of the pickup tube is altered from the nominal setting, such as for example, by varying the effective potential between the electron beam cathode and the scanned target electrode by apparatus responsive to video signal level. The sensitivity control circuit includes an effective switch which maintains the circuit operative so long as the video signals remain above a selected minimum threshold amplitude. For video signals below such the threshold amplitude, the sensitivity control circuit is rendered inoperative and the pickup tube reverts to the nominal sensitivity setting. At the same time, another effective switch responsive to less than threshold amplitude video signal reduces the gain of the video signal processing amplifier to a point which effectively prevents a video signal, which may have objectionable spurious effects, from being transferred to other apparatus utilizing the camera output. When sufficient light from the subject again produces a video signal above the threshold amplitude, the automatic sensitivity control apparatus again functions to vary the target voltage of the pickup tube. However, since such variation is from the nominal sensitivity setting, the resultant video signal has no objectionable transient effects as would be the case where the variation starts from a relatively high sensitivity setting.

For a better understanding of the invention, reference may be had to the following description of an illustrative embodiment thereof which is taken in conjunction with the accompanying drawings of which:

FIG. 1 is a block diagram of the essential elements of one practical embodiment of the invention;

FIG. 2 is a schematic circuit diagram of that portion of the apparatus of FIG. 1 by which the video signal gain control is effected;

FIG. 3 is a schematic circuit diagram of the automatic sensitivity control apparatus corresponding to that shown in FIG. 1; and FIG. 4 is a schematic circuit diagram of the automatic preset logic apparatus corresponding to that shown in FIG. 1.

Referring now to FIG. 1 of the drawings, the chain of apparatus by which the video signal derived from the pickup device is processed for transmission will be described generally in terms of the various functions performed as represented by the blocks shown in this figure. A video signal derived from the pickup device 11 is impressed upon the input of a video amplifier 12. This amplifier may consist of one or more stages, the output signal from which is impressed upon one input circuit of a controlled gain video amplifier 13. A train of white pulses 14, available at a terminal 15 during horizontal blanking intervals are amplified in a white pulse amplifier 16 to produce a train of amplified white pulses 17 for impression upon another input of the gain controlled amplifier 13. The amplitude of the white pulses 17 impressed upon the amplifier 13 is subject to manual variation by means of circuitry (subsequently disclosed in detail) included in control apparatus 18. In one mode of gain control operation, the white pulses are used to control the gain of the amplifier 13. In accordance with a feature of this invention, the white pulse amplitude also is subject to automatic control by a connection to an automatic preset logic circuit 19 in a manner later to be described. The purpose of such amplitude variations also will be explained subsequently. The white pulses 17 are added to the video signal in the amplifier 13 during horizontal blanking intervals to produce a composite video signal in the output circuit of this amplifier which includes a video signal portion having white and black signal peaks during the trace period of each horizontal scanning interval and having white pulses during the retrace period of each horizontal scanning interval. The particular way in which the gain controlled amplifier 13 has its degree of amplification controlled will be subsequently described in connection with FIG. 2.

The composite video signal derived from the controlled gain amplifier 13 is impressed upon other signal processing apparatus (not shown) and ultimately upon an output amplifier 20 for impression upon an output circuit from which it is applied to suitable utilization apparatus for eventual transmission. A video signal derived from the video signal output amplifier 20 also is impressed upon the preset logic circuit 19 for its operation as subsequently described.

The video signal appearing at the output of the video output amplifier 20 is coupled to the input of a gain control peak detector 21. This detector normally responds to either the peak white video signals occurring during the scanning interval or to the white pulses 17 occurring during the retrace interval depending upon whether automatic or manual gain controlling operation is in effect. The detector produces in its output circuit a unidirectional voltage which is amplified in a gain control DC amplifier 22 and applied to a variable gain control circuit associated with the controlled gain amplifier 13.

If it is desired to effect automatic gain control of the video signal, a gating pulse 24 is applied to one terminal 25 of a gain control reference amplifier 26 which is biased so as to establish a reference level relative to which the peak detector 21 operates. The detector is operative during the horizontal scanning intervals to detect the peak white video signals and is rendered inoperative during horizontal retrace intervals by the gating pulses 24. In accordance with a later-to-be-described feature of the invention, the detector 21 also is rendered capable of operation for a portion of each horizontal retrace interval by horizontal drive pulses 27 applied to terminal 28 of the reference amplifier 26. The reference level for the detector is determined by controlling the biasing of the reference amplifier 26, partly from within the amplifier and partly from the white level control apparatus 18 as will be disclosed in detail subsequently.

When manual gain control is desired by means of the white pulses 17 in the composite signal, the operational capability of the detector 21 is controlled by the horizontal drive pulses 27 applied to terminal 28 of the gain control reference amplifier 26. The pulses 27 effectively render the peak detector 21 inoperative during horizontal trace periods and operative only during horizontal retrace periods. For this type of operation, the biasing control of the amplifier 26 from the white level control apparatus 18 is discontinued and a fixed bias only is applied to the reference amplifier 26 from within the amplifier itself. The detector 21 then responds only to the white pulses 17, the amplitude of which is controlled from the control apparatus 18 as previously described. In accordance with a feature of the present invention, however, the white pulse amplitude is subject to other controls which will be described subsequently.

The performance of either the automatic or manual gain controlling function does not, however, effect any compensation for variations of the amplitude of the video signals derived from the pickup device 11, such as those which may be caused, for example, by variations in the average light admitted to the pickup device from the subject. For this purpose there is provided an automatic sensitivity control video amplifier 29 which derives a signal from the output of the video amplifier 12. This signal is passed to an automatic sensitivity control detector 31 which is under the control of a gating amplifier 32 so as to eliminate from the signal any effects which may be present in the signal during blanking intervals. Although the signal derived from the video signals during the horizontal blanking intervals such as the white pulses 17, the blanking of the pickup device during the horizontal retrace intervals may produce unwanted spurious transient effects which should be removed from the signal before it is detected for automatic sensitivity control purposes. Hence, the gating amplifier 32 renders the detector 31 operative during all but the first and last parts of the horizontal trace intervals by means such as the described gating pulses 24 applied to terminal 33 of the amplifier 32. By such means, any spurious signal effects, such as those caused by blanking of the pickup device 11, are removed from the video signal which is impressed upon the automatic sensitivity control detector 31 to produce a unidirectional control voltage.

This voltage, after suitable amplification by an amplifier 34, normally is impressed upon the floating (i.e. ungrounded) power supply 35 for the image pickup device 11 through a normally closed circuit of the preset logic 19. The control voltage derived from the amplifier 34 is applied to vary the effective target voltage of the pickup tube 11 (and, thus, the tube's sensitivity) so as to maintain substantial amplitude uniformity of the video signal derived from the pickup device and impressed upon the video signal amplifying and processing circuits such as those previously described. Sensitivity of the pickup device may also be varied by using the control voltage to control a motor, for example, by which an iris diaphragm or variable neutral density filter may be changed to alter the amount of light entering the pickup device from the subject.

The effective target voltage of the pickup tube 11 is varied by grounding the target 36 through a resistor 37 and by altering the voltages derived from the floating power supply 35 relative to ground. Thus, the voltage applied to the cathode 38 of the tube 11 is changed relative to ground, thereby effecting the necessary change in the cathode-to-target voltage for altering the camera sensitivity. By supplying operating potentials to the other electron scanning beam control electrodes of the pickup tube 11 from the floating power supply 35 these electrodes are maintained in a fixed potential relationship to one another and to the cathode 38.

Thus, as the light input to the pickup tube 11 decreases, which tends to reduce the level of the video signals applied to the video amplifier 12, the sensitivity of the tube 11 is increased such as by increasing the effective target voltage or by equivalent means as described. By such means the video signals applied to the amplifier 12 are maintained substantially at a desired level and the automatic gain controlling apparatus functions normally. Should the light input to the pickup tube 11 decrease effectively to zero such as when a motion picture film subject fades to black, the output from the pickup tube, such as a device having a photoconductive target, produces essentially only a spurious output which is derived from what is known as "dark current." Such an output is one which it is desired to suppress. As previously described, the sensing of such an output causes the automatic sensitivity control apparatus to increase the effective cathode-to-target voltage of the tube 11 to increase its sensitivity. This operation only serves to increase the amplitude of such undesired spurious signals.

When the sensitivity of the pickup tube 11 is increased automatically to a point such that the amplitude of the video signal derived from the video output amplifier 20 falls below a threshold value set in the automatic preset logic circuit 19, the control circuit between the automatic sensitivity control amplifier 34 and the floating power supply 35 is opened. The sensitivity of the pickup tube 11 is then returned to a nominal value determined by a preset adjustment of a target voltage control at the power supply 35. At the same time, the preset logic circuit 19 effects a control of the white pulse amplifier 16 which operates to reduce the gain of the video amplifier 13 to the point where any spurious signal output from the pickup tube 11 is reduced to such a low level that no undesired signal effects are produced in the output from the video amplifier 20. The manner in which these two results are obtained will be described in greater detail subsequently.

Reference now is made to FIG. 2 for a detailed explanation of the operation of the apparatus by which gain control is achieved, whereby to maintain the peak white video signals at a preselected amplitude relative to the blanking level of the video signal. As previously described, gain control of the video signal is accomplished by detecting either the peak white video signals occurring during horizontal trace intervals of the white pulses occurring during horizontal retrace intervals. The detector 21 includes a transistor 41 which receives a signal at its base electrode derived from the video output amplifier 20 of FIG. 1 in which white signals are positive-going and black signals are negative-going. This signal effectively is compared with a reference voltage applied to the emitter electrode of the transistor 41 so as to produce at the collector electrode a DC voltage representing any difference between the peak video signal and the reference voltage.

The reference voltage derived from the gain control reference amplifier 26 is selected by suitably controlling the voltages applied to and derived from the transistors 42 and 43 which are connected as a feedback pair in which the collector electrode of the input transistor 42 drives the base electrode of the output transistor 43 and the emitter electrode of the output transistor is coupled by a feedback resistor 44 to the base electrode of the input transistor. The resistor 44 also supplies the reference voltage to the peak detector transistor 41. The input transistor 42 serves to combine two signal effects: (1) the DC signal impressed upon its emitter electrode from the voltage divider 45 alone or in conjunction with the control apparatus 18; and (2) the pulse signal (either the gating pulse 24 or the horizontal drive pulse 27 or both) impressed upon its base electrode by the circuit including a diode 46. The voltage developed at the emitter electrode of the output transistor 43, therefore, is an additive combination of the DC and pulse signals applied to the input transistor 42.

For the purpose of this description assume that it is desired to effect gain control automatically in response primarily to the peak white signals occurring during the horizontal trace intervals. A relay 47 is de-energized so that through its contact 48, in its unoperated position shown, the gating pulse 24 is applied in the polarity shown to the base circuit of the input transistor 42 through a resistor 49 and the diode 46. The polarity of the gating pulse 24 is such that, during all of the horizontal trace interval, there is no current flow in the circuit through diode 46.

The input transistor 42 is biased under the joint control of apparatus including the voltage divider 45 and a variable resistor 51, both located at the camera or pickup apparatus, and a potentiometer 52, located in the control apparatus 18 which generally is at a point remote from the camera or pickup apparatus. The potentiometer is connected to the gain control reference amplifier by contact 53, in its unoperated position shown, of the relay 47. The biasing of the transistor 42 is such that the collector-to-emitter conduction in the transistor 43 causes a votage to be appllied to the emitter electrode of the detector transistor 41 which establishes a threshold level. White peaks of the video signal applied to the base electrode of transistor 41 which exceed this threshold level cause the transistor 41 to conduct.

Increases in the positive-going amplitude of the white signal peaks impressed upon the base electrode of the detector transistor 41, increase the average conduction in the collector-to-emitter circuit of the transistor to produce a less positive DC output signal. This DC signal is applied to the gain control DC amplifier 22 and thence to the variable gain circuit of the controlled gain video amplifier 13 to decrease the gain of the amplifier in a manner to be particularly described presently. Thus, the peak white amplitude of the video signal is decreased so that it is restored to the amplitude selected by the described control facilities including the potentiometer 52 of the gain control apparatus 18.

Any decrease in the amplitude of the white peak video signals from the selected amplitude renders the detector transistor 41 inoperative so that the DC voltage derived from the collector decreases (becomes more positive) by operation of the time constant circuit associated with the collector electrode. The more positive DC voltage, after amplification by the gain control amplifier 22, is effective through the agency of the variable gain circuit of the amplifier 13 to increase the gain of this amplifier until the peak white signals again are restored to the desired amplitude.

During horizontal retrace intervals, the effect of the negative-going gating pulse 24 alone is to cause conduction through the diode 46 of the reference amplifier 26, thereby to bias the input transistor 42 to a substantially non-conducting state. This condition results in an increase in conduction in the collector-to-emitter circuit of the output transistor 43 such that a sufficiently high positive voltage is impressed upon the emitter electrode of the detector transistor 41 to render it completely inoperative. In this manner the detector 21 normally is rendered completely unresponsive to signal effects such as the white pulses occurring during horizontal retrace intervals.

This is a desired mode of operation in some applications of apparatus of the character under consideration. In a particular application, which will be described more fully subsequently, the present apparatus is provided with a connection including a resistor 54 whereby horizontal drive pulses 27 are combined with the gating pulses 24 to produce a composite control signal 55 for impression upon the base electrode of the input transistor 42 when automatic gain control of the video signal is being effected. The transistor 41 is, thus, rendered conducting during the entire trace period and also during that part of each retrace period in which the white pulse occurs. In other words, the peak detector 21 is operative at all times except at the beginning and end of the retrace period so that it can respond to either peak white video signals or to white pulses which normally are kept at a reduced amplitude, equal to no more than approximately one-third of the desired peak white video signal amplitude.

The controlled gain video amplifier 13 includes a feedback pair of transistors 56 and 57. The video signal derived from the video amplifier 12 of FIG. 1 is impressed upon the base electrode of the input transistor 56 in such polarity that white signals are negative-going and black signals are positive-going. Signal output from the input transistor 56 is derived from the collector electrode and impressed upon the base electrode of the output transistor 57 which is connected as an emitter follower so that the output signal has such polarity that white is positive-going and black is negative-going.

A DC degenerative feedback path from the emitter electrode of the output transistor 57 to the base electrode of the input transistor 56 is provided by a circuit including a resistor 58. This resistor provides a fixed amount of feedback so as to maintain the operating points of the respective transistors 56 and 57 substantially constant. An AC degenerative feedback path from the output transistor 57 to the input transistor 56 is provided by a circuit including a capacitor 59 in series with the parallel arrangement of two variable resistors 61 and 62 which constitute a variable gain circuit for the amplifier 13. These resistors are of a photo-resistive type and include light sources 63 and 64 respectively. The light sources are connected in series and to the output of the gain control DC amplifier 22 from which they receive the DC control voltage produced in the manner previously described with reference to the operation of the peak detector 21. A variation of the DC energizing voltage for the light sources 63 and 64 produces variations in the magnitude of the resistors 61 and 62, thereby varying the AC feedback between the transistors 57 and 56 to produce a suitable variation in the gain of the amplifier 13.

The white pulse 17, after appropriate amplitude control by the white pulse amplifier 16, is impressed upon the base electrode of the input transistor 56 of the controlled gain video amplifier 13 by a circuit including a series arrangement of a coupling capacitor 65 and a resistor 66. By such means the white pulses 17 are added during horizontal retrace intervals to the video signal derived from the amplifier 12 of FIG. 1 so as to produce at the output of the amplifier 13 a composite video signal for impression upon the video amplifier 19 of FIG. 1.

When it is desired to manually control the gain of the video signal, a switch 67 at the control apparatus 18 is closed to apply a negative operating voltage to the relay 47. The control apparatus also includes a sensitivity control switch 68 which, when closed, impresses a positive voltage on a terminal 69 for a purpose to be described subsequently in connection with FIG. 4. The relay contact 53, in its operated position, disconnects the gain controlling potentiometer 52 at the control apparatus 18 from the gain control reference amplifier 26 and connects it to the white pulse amplifier 16 for a purpose to be described subsequently. The biasing of the gain control reference amplifier 26 under such conditions then is controlled only by the biasing circuits including the voltage divider 45 and the variable resistor 51 located at the camera or image pickup apparatus. The contact 48, in its operated position, of the relay 47 impresses the positive-going horizontal drive pulse 27 upon the circuit including the diode 46 of the amplifier 26. By means of such a pulse, the amplifier 26 is operated so as to render the peak detector transistor 41 inoperative during horizontal trace intervals and to render this transistor capable of operation only during the horizontal retrace intervals. Thus, the peak detector 21 responds only to the white pulses which occur during the horizontal retrace intervals.

The white pulse 14 available at the terminal 15 is applied to the base electrode of a transistor 70 included in the white pulse amplifier 16. A fixed voltage derived from a voltage divider comprising resistors 71 and 72 is applied to the collector electrode of this transistor so that, in the absence of any other voltages applied to this electrode, there is produced a white pulse 17 having about one-third of the amplitude of the desired white peak video signal amplitude as previously described. The voltage divider circuit normally is completed from terminal 73 by grounding the resistor 72 at the automatic preset logic circuit 19 (FIG. 4) as indicated and as subsequently described. Another voltage which is applied to the collector electrode of the transistor 70 during manual gain control operation is derived from the potentiometer 52 at the control apparatus 18. This latter voltage overrides the fixed voltage derived from the voltage divider resistors 71 and 72. The adjustment of the potentiometer 52, thus, controls the amplification of the white pulses so that, after they have been added to the video signal during the horizontal retrace intervals in the manner described, the gain control of the controlled gain video amplifier 13 is effected by the described detection of the white pulses by the peak detector 21.

Reference now is made to FIG. 3 for a detailed description of the operation of apparatus by which the sensitivity of the video signal generating pickup device is automatically controlled. The pickup tube 11, for purpose of the illustrative disclosed of the invention, is a photoconductive type such as a vidicon. The video signals derived from the target electrode 36 of the pickup tube are coupled by a capacitor 74 to the input circuit of the video amplifier 12. The amplified video signals derived from this amplifier, in addition to being applied to further signal processing apparatus such as the controlled gain video amplifier 13 are impressed upon the base electrode of an input transistor 75 of the automatic sensitivity control video amplifier 29. This transistor and an output transistor 76 are arranged as a feedback pair in which the collector electrode of the input transistor 75 is connected to a voltage supply through a series arrangement of two load resistors 77 and 78. The collector electrode of the input transistor 75 also applies the video signal amplified thereby to the base electrode of the output transistor 76, from the emitter electrode of which an output video signal is obtained. A bootstrap type of feedback circuit is provided by a capacitor 79. The amplifier, thus, can operate with relatively high level signals using only a relatively low voltage power supply.

The amplified video signals derived from the emitter electrode of the output transistor 76 are coupled to the base electrode of a transistor 81 of the automatic sensitivity control detector 31. These signals are effectively compared with the voltage impressed upon the emitter electrode of this transistor from a biasing circuit including a potentiometer 82, the adjustment of which effectively determines the desired level of the video signals which are derived from the amplifier 29 and the pickup tube 11 and which it is desired to maintain by controlling the sensitivity of the pickup tube. Thus, there is produced at the collector electrode of the detector transistor 81 a voltage representing any deviation in the video signal from the desired level of such signals.

The video signal level representative signal derived from the detector 31 is impressed upon the base electrode of a transistor 83, forming part of the automatic sensitivity control output amplifier 34. This transistor is connected as an emitter follower, thereby producing at its emitter electrode an automatic sensitivity control voltage. At normal light levels this voltage is transferred, as indicated in FIG. 1, by way of the preset logic circuit 19 to the base electrode of a voltage controlling transistor 84 forming part of the power supply 35. The output circuit of the transistor 84 includes a power supply 85, the negative terminal of which is connected through load resistors 86 and 87 and a low voltage power supply 88 to ground. The emitter electrode of the transistor 84 is connected to a target voltage controlling potentiometer 89 which is connected across another low voltage power source 90 and which is adjusted to a nominal target voltage to which it is desired to operate the pickup tube 11.

The voltage at the junction point of the power supply 85 and the load resistor 86 relative to ground varies as the conductivity of the transistor 84 varies under the control of the voltage impressed upon its base electrode. This varying voltage is applied between ground and the floating power supply 35a, to which are connected the cathode 38 and other electron beam controlling electrodes of the pickup tube 11. Thus, as the voltage at the junction point between the power supply 85 and the load resistor 86 of the control amplifier 34 varies, the voltages relative to ground which are applied to the cathode 38 and other beam controlling electrodes of the pickup tube 11 from the floating power supply 35a also vary relative to ground. Inasmuch as the target electrode 36 of the pickup tube 11 is maintained effectively at ground potential by the circuit including the resistor 37, the effective cathode-to-target voltage is varied as the level of the output signals from the pickup tube vary. In other words, the sensitivity of the pickup tube is varied within set limits in response to detected video signal level changes resulting from variations in the light admitted to the camera so as to maintain a substantially constant video signal output level from the pickup tube.

The apparatus including the detector 31 and the amplifier 34 are effectively disabled during the retrace intervals in which the pickup tube 11 is blanked by means (not shown) by the operation of a gating amplifier 32 so that the automatic sensitivity control apparatus operates only during trace periods in response to video signals. In this way all spurious signal effects which may occur during retrace intervals and which would undesirably affect the operation of the sensitivity control apparatus are rendered incapable of doing so. A transistor 91 which is conducting during trace intervals has gating pulses 24 present at the terminal 33 applied to its base electrode by a diode 92. A diode 93 connected between the emitter electrode of transistor 91 and the base electrode of transistor 81 acts as a level setter for the video signals. During trace intervals the transistor 91 conducts heavily so as to effectively ground the anode of diode 93 so that the transistor 81 detects positive-going white peaks of the video signal referenced to ground. During retrace intervals, the negative-going portions of the gating pulse 24 render the transistor 91 nonconducting so that the diode 93 effectively references the signal from the amplifier 29 to a potential which is sufficiently negative to prevent any positive-going spurious signal effects from being detected by the transistor 81, thereby to render this transistor responsive only to the desired video signals derived from the amplifier 29.

The automatic preset logic circuit 19 of FIG. 1 is shown in detail in FIG. 4 to which reference now will be made. A video signal derived from amplifier 20 of FIG. 1 is impressed upon the base circuit of an amplifier driver NPN transistor 104 with white representative signals positive and black representative signals negative. A feedback circuit from the collector electrode to the base electrode of transistor 104 includes a fixed resistor 105 and a variable resistor 106. The variable resistor is adjusted to establish a threshold of video signal below which it is desired to disable the automatic sensitivity control apparatus in its effect upon the target voltage of the pickup tube 11 of FIGS. 1 and 3 as previously described. The collector electrode of the driver transistor 104 is connected to the base electrode of a saturating amplifier NPN transistor 107. For video signals above the threshold established by the adjustment of the variable resistor 106 and driver transistor 104 is conducting, thereby rendering nonconducting or cutting off the amplifier transistor 107.

With the amplifier transistor 107 cutoff, the positive voltage output thereof is peak detected by a circuit including a diode 108, a capacitor 109 and series and shunt resistors 111 and 112 respectively. The output of the peak detector circuit is impressed upon the base electrode of a switch driver NPN transistor 113 to render it conducting. The negative-going signal developed at the collector electrode of the switch driver transistor 113 is applied to the base electrode of a sensitivity switch transistor 114, which is of a PNP type. As indicated in FIG. 4, the emitter electrode of the sensitivity switch transistor 114 is connected to a terminal 115 which is connected to the automatic sensitivity control amplifier 34 of FIG. 3. Also, the collector electrode of the sensitivity switch transistor 114 is connected to a terminal 116 which is connected to the power supply 35 of FIG. 3. As previously described, the sensitivity switch transistor 114 in its conductive state effectively closes a circuit from the emitter electrode of the sensitivity control amplifier transistor 83 of FIG. 3 to the base electrode of the target voltage control transistor 84 of FIG. 3. Thus, the target voltage and hence, the sensitivity of the pickup tube 11 is automatically controlled in response to video signals in excess of the threshold value established by the setting of the variable resistor 106 of FIG. 4.

Any video signal derived from the amplifier 20 of FIG. 1 having an amplitude less than the threshold established by the path of the variable resistor 106, when applied to the base of the amplifier driver transistor 104 of FIG. 4 renders this transistor nonconducting. The resultant increased positive voltage developed at the collector electrode of the driver transistor 104, when applied to the base electrode of the saturating amplifier 107, drives this transistor to a saturated conducting state which effectively places the collector electrode thereof at ground potential. The peak detector circuit including the diode 108, therefore, produces no output and the sensitivity switch driver transistor 113 is rendered nonconducting. The increased positive voltage produced thereby at the collector electrode of the sensitivity switch driver 113, when applied to the base of the sensitivity switch transistor 114 renders this transistor nonconducting. Thus, the circuit between terminals 115 and 116 is rendered discontinuous, thereby effectively disabling the sensitivity control apparatus (FIG. 3) as to its effect upon the pickup tube target voltage.

Referring again briefly to FIG. 3, with the control voltage originally derived from the emitter electrode of the sensitivity control amplifier transistor 83 no longer being impressed upon the base electrode of the target control transistor 84, the conductivity of this transistor is controlled only by the base-to-emitter circuit including the potentiometer 89. This potentiometer is originally adjusted to a point where the target voltage control circuit including the transistor 84 places a nominal voltage on the target 36 of the pickup tube 11. It is to be understood that, if prior to the effective switch opening achieved by the rendering of switch transistor 114 of FIG. 4 nonconducting the video signal applied to the amplifier driver transistor 104 was decreasing in amplitude toward the threshold of transistor amplifier 106 because of a decrease in the subject light on the pickup tube, the automatic sensitivity control apparatus would have been functioning to increase the target voltage of the pickup tube so as to increase its sensitivity and thereby, increase the video signal level. In prior art arrangements, the automatic sensitivity control system would continue to increase the target voltage of the pickup to be to such a point that, when the subject light suddenly increased, objectionable transient effects were produced in the resultant video signal until the sensitivity control could function to produce the proper target voltage. Hence, the opening of the switch by the nonconductive sensitivity switch transistor 114 results in the re-establishment of only a nominal voltage on the target electrode 36 of the pickup tube 11. The video signal produced at such a pickup tube sensitivity upon an increase in subject light, therefore, has little or no objectionable transient content.

From a preceding description, it will be remembered that the video signal derived from the output amplifier 20 of FIG. 1 includes, not only a subject representative video signal during the trace period of a scanning interval, but also white pulses during the retrace period of a scanning interval. Since this is the type of signal which is applied to the amplifier driver transistor 104 of FIG. 4, it is necessary that the peak detector apparatus including the diode 108 be rendered unresponsive to the white pulses. This is accomplished by applying the negative-going gating pulses 24 to terminal 117. These pulses are present during the retrace period of each scanning interval. The gate pulses 24 at terminal 117 are impressed upon the base electrode of a blanker driver NPN transistor 118 which is normally conductive during trace periods of the scanning intervals. During a conductive state of the driver transistor 118, the voltage developed at its collector electrode, when applied to the base of a blanker NPN transistor 119, is suitable to render the blanker transistor nonconducting. Thus, when driver transistor 118 is rendered nonconducting by the gating pulses 24, the blanker transistor 119 is rendered conducting, thereby effectively grounding the collector electrode of the saturating amplifier transistor 117. This action results in the disabling of the peak detector circuit including the diode 108 during retrace periods so that the detector apparatus does not respond to the white pulses.

In addition to controlling the operation of the automatic sensitivity control of the pickup tube through the agency of the sensitivity switch transistor 118 as previously described, the preset logic circuit 19 of FIG. 4 includes a white level amplitude control switch NPN transistor 121, the base electrode of which is coupled to receive the output of the peak detector circuit including the diode 108. As long as the video signal derived from amplifier 20 of FIG. 1 exceeds the threshold level set by the adjustment of the variable resistor 106 to produce an output from the peak detector, the impression of this output on the amplitude control switch transistor 121 maintains this transistor in a highly conductive state. The circuit from ground through the emitter and collector electrodes of this transistor to a terminal 122 and thence to terminal 73 of FIG. 2 maintains the voltage divider resistor 72 connected to ground.

With the resistor 72 of the white pulse amplifier 17 of FIG. 2 connected to ground during automatic gain control operation in response to the video signals, the voltage applied to the collector electrode of the white pulse amplifier transistor 70 is such as to produce an output white pulse 17 of relatively small amplitude. When the video signal from video amplifier 20 (FIG. 1) falls below the threshold level to cutoff the peak detector (FIG. 4) the amplitude control switch transistor 121 is rendered nonconducting, thereby disconnecting the voltage divider resistor 72 of FIG. 2 from ground. This has the effect of increasing the amplitude of the white pulse 17 derived from the amplifier transistor 70. When this relatively large amplitude white pulse 17 is added to the composite video signal in the controlled gain video amplifier 13 as described, the gain controlled peak detector 21 responds to it in a manner to decrease the amplifying capability of the amplifier 13 as previously described, so as to effectively reduce the amplitude of the video signal derived from the amplifier 13 and, thus, to render it unobjectionable.

The foregoing description of the manner in which the preset logic circuitry 19 of FIG. 4 functions to control the sensitivity of the pickup tube and the operation of the automatic gain control apparatus in response to video signals derived from the pickup tube representing dark or black areas of the subject matter has been given with reference to a mode of operation in which gain control of the signals is effected automatically in response to the video signal. When it is desired to manually control video signal gain, the switch 67 of the control apparatus 18 of FIG. 2 is closed to operate relay 47 and to alter the circuits of the gain control reference amplifier 26 and the white pulse amplifier 16 in the manner previously described.

The control apparatus 18 of FIG. 2 also includes a switch 68 which, when closed, enables manual control of pickup tube sensitivity. The operation of the switch 68 places a positive voltage on terminal 69 which is connected to terminal 123 of the preset logic circuitry 19 of FIG. 4. This voltage is impressed upon the base electrodes of switch driver transistor 113 and white level amplitude switch transistor 121. The transistors 113 and 121, thus, are maintained in their conductive states which respectively results in maintaining circuit continuity between the sensitivity control amplifier 34 and the power supply 35 of FIG. 3 and maintains a ground on resistor 72 of the white pulse amplifier 13 of FIG. 2. Thus, the sensitivity control amplifier 34 of FIG. 3 may be controlled manually by means forming no part of the instant invention and, hence not shown, and, with the circuit intact to the power supply 35, the pickup target voltage may be altered. Also, the white pulse amplifier of FIG. 2 is maintained in a condition to operate independently of preset logic circuitry 19 of FIG. 4.

When gain of amplifier 13 is being controlled automatically in response to peak white video signals and contacts 48 and 53 of relay 47 are in the illustrated unoperated positions, an additional safeguard feature is provided by the described impression upon the gain control reference amplifier 26 of both gating pulses 24 and horizontal drive pulses 27. Normally, when the video signals have a substantial level, the gain control peak detector 21 responds only to the video signals in comparison with the reference voltage derived from the amplifier 26. White pulse amplifier 16, however, is biased by the voltage divider comprising resistors 72 and 73 as described so as to produce white pulses 17 during retrace intervals having an amplitude which is approximately one-third of the desired amplitude of the video signals produced during trace periods. Should the video signals produced during trace periods fall below one-third of their desired amplitude, the automatic gain control apparatus responding to such signals tends to increase the gain of the amplifier 13. However, since the detector 21 is made to respond to the one-third amplitude white pulses during retrace periods, it will prevent the automatic gain control apparatus from increasing the gain of the amplifier 13 beyond a point which is determined by the one-third amplitude white pulses.

What is claimed is:

1. In a television camera control system:
   a pickup tube for producing a video signal in response to and representative of a light image during the trace period of each scanning interval;
   means for varying the sensitivity of said pickup tube;
   means for adjusting said sensitivity varying means to establish a selected nominal sensitivity of said pickup tube;
   sensitivity control means responsive to a variation of the level of the video signal produced by said pickup tube to automatically adjust said sensitivity varying means to alter the sensitivity of said pickup tube from said nominal sensitivity in a manner tending to maintain a substantially constant level of said produced video signal; and
   limiter means responsive to a produced video signal of less than a selected level to effectively disable said sensitivity control means, thereby to re-establish said nominal sensitivity of said pickup tube.

2. In a television camera control system:
   a pickup tube for producing a video signal in response to and representative of a light image during the trace period of each scanning interval;

means for varying the sensitivity of said pickup tube;

means for adjusting said sensitivity varying means to establish a selected nominal sensitivity of said pickup tube;

sensitivity control means responsive to a variation of the level of the video signal produced by said pickup tube to automatically adjust said sensitivity varying means to alter the sensitivity of said pickup tube from said nominal sensitivity in a manner tending to maintain a substantially constant level of said produced video signal; and limiter means responsive to a produced video signal of less than a selected level to effectively disable said sensitivity control means, thereby to re-establish said nominal sensitivity of said pickup tube;

said limiter means including a circuit element connected between said sensitivity control means and said sensitivity varying means;

said circuit element normally being conductive and controllable to be rendered non-conductive in response to a video signal of less than said selected level.

3. In a television camera control system as defined in claim 2, wherein:

said limiter means also includes control signal generating means responsive to a video signal of greater than said selected level to produce a first control signal and responsive to a video signal of less than said selected level to proluce a second control signal; and means for impressing said control signals upon said circuit element to render it conductive in response to said first control signal and non-conductive in response to said second control signal.

4. In a television camera control system as defined in claim 3, wherein:

said control signal generating means includes a detector operative in response to a first signal effect representative of a video signal of greater than said selected level to develop said first control signal and inoperative in response to a second signal effect representative of a video signal of greater than said selected level to develop said second control signal.

5. In a television camera control system as defined in claim 4, wherein:

said control signal generating means also includes an amplifier biased for full response to a video signal of greater than said selected level to produce said first signal effect and for no response to a video signal of less than said selected level to produce said second signal effect.

6. In a television camera control system as defined in claim 5, wherein:

said amplifier includes a variable biasing means for establishing said selected video signal level.

7. In a television camera control system as defined in claim 6, wherein:

said control signal generating means also includes a blanker operative during the retrace period of each scanning interval to disable said detector during each retrace period.

8. In a television camera control system as defined in claim 1, having additionally:

amplitude control means responsive to a produced video signal of less than said selected level to further reduce said video signal amplitude.

9. In a television camera control system as defined in claim 8, wherein:

said amplitude control means is coupled to receive the output of said detector.

10. In a television camera control system as defined in claim 9, having additionally:

means coupled to said sensitivity and amplitude control means to maintain them independently of video signal control in their states corresponding to a video signal of greater than said selected level.

References Cited

UNITED STATES PATENTS

| | | |
|---|---|---|
| 2,930,929 | 3/1960 | Shelton. |
| 3,086,077 | 4/1963 | Mayer. |
| 3,206,547 | 9/1965 | Leitich et al. |
| 3,332,017 | 7/1967 | Dennis _____ 325—144 XR |

ROBERT L. GRIFFIN, Primary Examiner

R. MURRAY, Assistant Examiner